(12) United States Patent
Tajiri

(10) Patent No.: US 8,305,521 B2
(45) Date of Patent: Nov. 6, 2012

(54) LIQUID CRYSTAL MODULE

(75) Inventor: Tomohisa Tajiri, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 345 days.

(21) Appl. No.: 12/792,182

(22) Filed: Jun. 2, 2010

(65) Prior Publication Data

US 2010/0309405 A1    Dec. 9, 2010

(30) Foreign Application Priority Data

Jun. 5, 2009  (JP) .............................. P. 2009-135747

(51) Int. Cl.
*G02F 1/1335* (2006.01)
*G02F 1/1333* (2006.01)

(52) U.S. Cl. .............. 349/64; 349/60; 349/58; 362/632; 362/633; 362/634

(58) Field of Classification Search .................... 349/58, 349/64, 65, 67, 60; 362/97.2, 97.1, 632, 362/633, 634, 614, 609, 558, 560, 561
See application file for complete search history.

(56) References Cited

U.S. PATENT DOCUMENTS

2007/0230210 A1   10/2007  Tsai et al.

FOREIGN PATENT DOCUMENTS

| JP | 3-009324 | 1/1991 |
|----|----------|--------|
| JP | 2001/075490 | 3/2001 |
| JP | 2004-192912 | 7/2004 |
| JP | 2001-075490 | 3/2010 |

OTHER PUBLICATIONS

Extended European Search Report dated Dec. 22, 2011 for corresponding application No. 10163864.1.

*Primary Examiner* — Thoi Duong

(74) *Attorney, Agent, or Firm* — Morgan, Lewis & Bockius LLP

(57) ABSTRACT

A liquid crystal module is provided. A rear frame is provided with a pair of side plates which are formed along a pair of long opposite sides of the rear frame. A light diffuser plate is comprised of synthetic resin and provided with a pair of frame portions which are formed integrally with the light diffuser plate, disposed along a pair of long opposite sides of the light diffuser plate and respectively attached to the side plates of the rear frame. A pair of cushion members are disposed along and inside the frame portions of the light diffuser plate. A liquid crystal panel has an upper edge portion and lower edge portion which are supported by the cushion members. The light diffuser plate is provided with a pair of slope portions which are formed integrally with the light diffuser plate and disposed along and inside the cushion members. The height of each slope portion increases toward an adjacent cushion member for concealing the cushion members.

4 Claims, 5 Drawing Sheets

LIQUID CRYSTAL MODULE

The disclosure of Japanese Patent Application No. 2009-135747 filed on Jun. 5, 2009 including specification, drawings and claims is incorporated herein by reference in its entirety.

BACKGROUND

The present invention relates to a liquid crystal module to be installed in an electronic device such as a television, a personal computer, or the like. More particularly, the present invention relates to a liquid crystal module which is capable of solving a problem occurring when a light diffuser plate which is made of synthetic resin and is disposed at a rear side of a liquid crystal panel is formed integrally with a frame portion which is made of synthetic resin and is used for fixing the light diffuser plate to the rear frame.

In a related-art liquid crystal module, edge portions of an light diffuser plate which is disposed at a rear side of a liquid crystal panel is overlapped with side plates of a rear frame in which a light source such as a cold cathode tube is accommodated. The edge portions of the light diffuser plate is pressed and fixed to the rear frame by a frame component (a cell guide) made of synthetic resin.

In order to reduce costs by reducing the number of components and the number of assembly processes, there is a liquid crystal module in which the light diffuser plate is formed integrally with the frame component (the cell guide) made of synthetic resin. In such a liquid crystal module, as shown in FIG. 9, a cushion member 106 is disposed inside a frame portion 105a which is formed integrally with the light diffuser plate 105, and an edge portion of the liquid crystal panel 108 is supported by this cushion member 106.

In addition, Patent Document 1 discloses a liquid crystal display device in which a frame is formed integrally with a circumference of a diffuser plate and a circumferential edge portion of a liquid crystal panel is directly supported by this frame, and Patent Document 2 discloses a direct backlight using a diffuser plate-integrated upper frame in which a diffuser plate is formed integrally with a circumferential edge portion of an upper frame, and an circumferential edge portion of a liquid crystal panel is supported by a stepped support portion of the frame.

Patent Document 1: JP-A-2001-75490
Patent Document 2: JP-A-2004-192912

However, in the related-art liquid crystal module, as shown in FIG. 9, in which the cushion member 106 is disposed inside the frame portion 105a of the light diffuser plate 105 to support the edge portion of the liquid crystal panel 108, the cushion member 106 is likely to be inside an imaginary line L1 indicating a viewing angle range of a display surface of the liquid crystal panel 108. Accordingly, the cushion member 106 may be viewable from the display surface of the liquid crystal panel 108, and it deteriorates the display quality. As a dimension from an imaginary line L2 indicating an end of a display range of the liquid crystal panel 108 to an end of the liquid crystal panel 108 decreases, the cushion member 106 enters further into the viewing angle range indicated by the imaginary line L1, and thus the cushion member 106 can be easily seen. Therefore, such a problem is not negligible.

Meanwhile, in the liquid crystal display device disclosed in Patent Document 1 and the direct backlight disclosed in Patent Document 2, since the liquid crystal panel is not supported by the cushion member, the cushion member is not seen from the display surface of the liquid crystal panel. However, in the liquid crystal display device disclosed in Patent Document 1, a stepped bent portion between the frame and the diffuser plate which are formed integrally with each other are easily seen from the display surface of the liquid crystal panel. In the direct backlight disclosed in Patent Document 2, there is also a problem in that since the stepped support portion of the diffuser plate-integrated upper frame and the stepped bent portion of the diffuser plate can be easily seen from the display surface of the liquid crystal panel, the display quality is deteriorated.

SUMMARY

It is therefore an object of at least one embodiment of the present invention to provide a liquid crystal module capable of improving the display quality by concealing a cushion member supporting a liquid crystal panel from a display surface of the liquid crystal panel.

In order to achieve the above described object, according to an aspect of at least one embodiment of the present invention, there is provided a liquid crystal module, comprising: a rear frame provided with a pair of side plates which are formed along a pair of long opposite sides of the rear frame; a light diffuser plate comprised of synthetic resin and provided with a pair of frame portions which are formed integrally with the light diffuser plate, disposed along a pair of long opposite sides of the light diffuser plate and respectively attached to the side plates of the rear frame; a pair of cushion members disposed along and inside the frame portions of the light diffuser plate; and a liquid crystal panel having an upper edge portion and lower edge portion which are supported by the cushion members, wherein the light diffuser plate is provided with a pair of slope portions which are formed integrally with the light diffuser plate and disposed along and inside the cushion members, and wherein the height of each slope portion increases toward an adjacent cushion member for concealing the cushion members.

A top portion of each slope portion may protrude outside of a viewing angle range of a display surface of the liquid crystal panel.

The light diffuser plate may be provided with a concave portion at an opposite side of each slope portion. The light diffuser plate may be provided with a curved portion between a slope surface of the slope portion and a flat surface of the light diffuser plate so that the flat surface is smoothly continuous with the slope surface.

In the above liquid crystal module, the edge portions of the liquid crystal panel is supported by the cushion members. Even when a user sees the display surface of the liquid crystal panel at an angle along the imaginary line indicating the viewing angle range, the cushion members are concealed by the slope portions which are formed with the light diffuser plate so as to protrude from the surface of the light diffuser plate and are disposed inside the cushion members. Since the diffused light emitted from the slope portions comes into view, the user cannot see the cushion members. In addition, even when the slope portions for concealing the cushion members are formed integrally with the light diffuser plate, since the bending angle between the slope surface of each slope portion and the flat surface of the light diffuser plate is an obtuse angle, the bent edge portion is unlikely to be seen. Moreover, a negative effect, such as variation in brightness, does not occur at the display surface of the liquid crystal panel due to the slope portions. As a result, the above-configured liquid crystal module can improve the display quality. In addition, if the slope portions are integrally formed with the diffuser plate, the cushion members is interposed and exactly located between the frame portion of the light diffuser plate and the slope portions.

In particular, when the top portion of each slope portion protrudes outside of the viewing angle range of the display surface of the liquid crystal panel, the cushion members of which a portion enters the viewing angle range are completely concealed by the slope portions and thus cannot be seen at all.

Since a portion of the light diffuser plate where the slope portions are integrally formed is slightly thick relative to the other portion of the light diffuser plate, a light beam transmittance of the light diffuser plate may be locally slightly deteriorated. If the light diffuser plate is provided with a concave portion at an opposite side of each slope portion, it can suppress the increase in thickness in the portion where the slope portions are integrally formed, thereby preventing the local deterioration of the light beam transmittance. As a result, it is possible to prevent the variation in brightness on the display surface of the liquid crystal panel.

If the light diffuser plate is provided with a curved portion between a slope surface of the slope portion and a flat surface of the light diffuser plate so that the flat surface is smoothly continuous with the slope surface, there is no bent edge between the light diffuser plate and the slope portions, so that the curved portion cannot be seen from the display surface of the liquid crystal panel, thereby further improving the display quality.

DETAILED DESCRIPTION OF THE EMBODIMENTS

Figure 1:
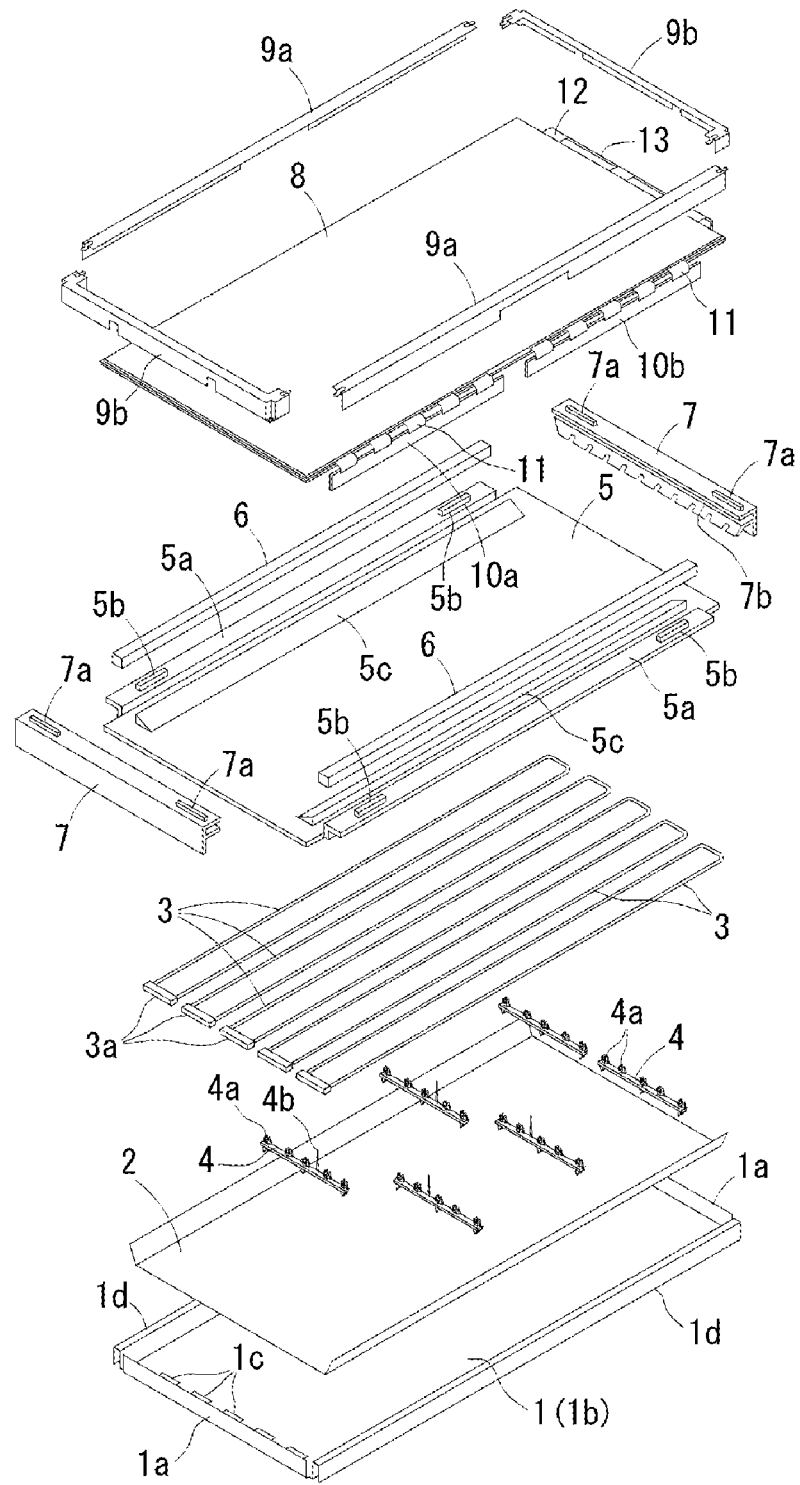
FIG. 1 is an exploded perspective view illustrating a liquid crystal module according to an embodiment of the present invention.
Figure 2:
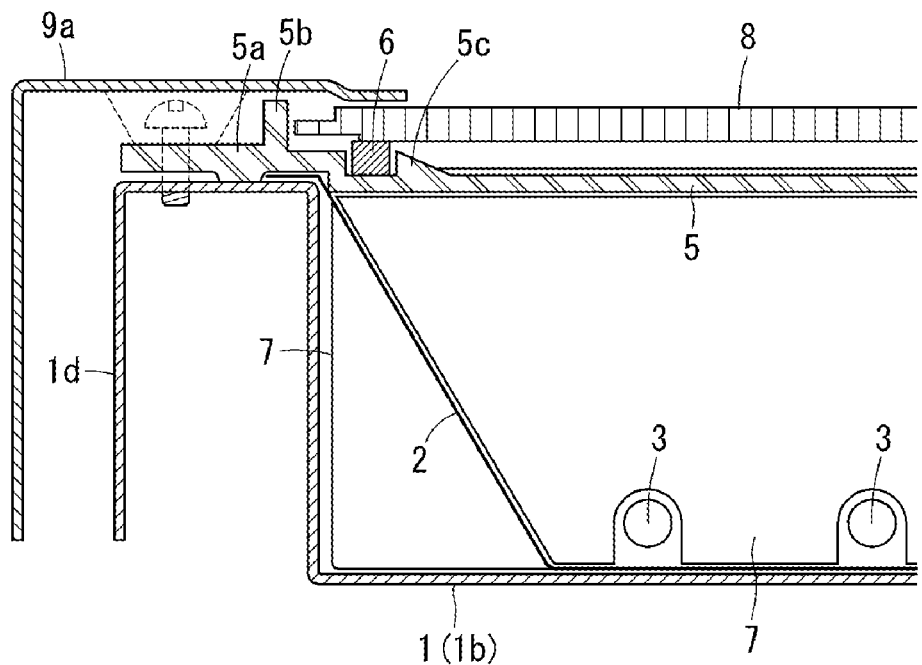
FIG. 2 is a partial longitudinal cross-sectional view illustrating the liquid crystal module according to the embodiment.
Figure 3:
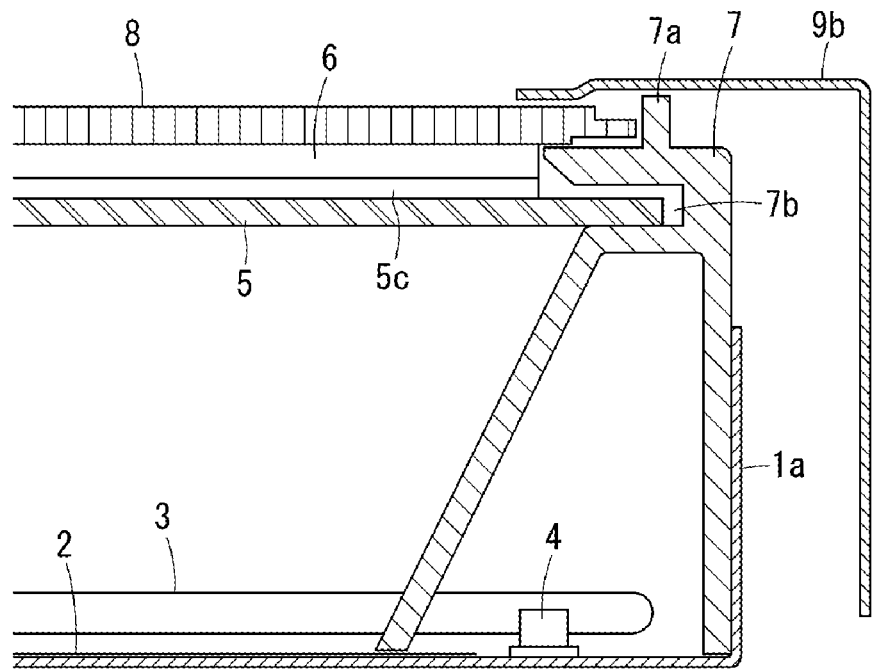
FIG. 3 is a partial horizontal cross-sectional view illustrating the liquid crystal module according to the embodiment.

A liquid crystal module shown in FIGS. 1 to 3 is a large-sized liquid crystal module to be installed in liquid crystal television with a large screen. The liquid crystal module includes a rear frame 1, a reflector sheet 2, U-shaped cold cathode tubes 3, lamp holders 4, a light diffuser plate 5, a pair of cushion members 6, a pair of lamp frames 7, a liquid crystal panel 8, bezels 9a and 9b.

The rear frame 1 is a shallow box-shaped rear frame formed by bending a sheet metal, and the reflector sheet 2 is provided inside of the rear frame 1. A plurality (five in this embodiment) of U-shaped cold cathode tubes 3 are arranged in parallel with each other on the reflector sheet 2. The U-shaped cold cathode tubes 3 are supported by a plurality (six in this embodiment) of lamp holders 4. Each lamp holder 4 is provided with holding portions 4a which fix and hold the U-shaped cold cathode tubes 3, as shown in FIG. 1. The four lamp holders 4 holding center portions of the U-shaped cold cathode tubes 3 are provided with a post 4b supporting the light diffuser plate 5 from below to prevent bending of the light diffuser plate.

Lamp sockets 3a are attached to end portions of the U-shaped cold cathode tubes 3. The lamp sockets 3a are fixed and held into opening portions 1c which are provided in a bottom plate 1b of the rear frame 1 along a short side plate 1a (left side plate) of the rear frame 1. Lead wires (not shown) of the U-shaped cold cathode tubes 3 are drawn out from each of the lamp sockets 3a toward a rear side of the rear frame 1.

Both ends of the U-shaped cold cathode tubes 3 are covered by lamp frames 7 attached to left and right short side plates 1a and 1b of the rear frame 1 to reduce variation in brightness of the lamp socket 3a. The lamp frames 7 also serve as a cell guide. As shown in FIGS. 1 and 3, convex portions 7a are provided on the upper surface of the lamp frame 7 which supports the edge portion of the liquid crystal panel 8, in the vicinity of both end portions of the upper surface to position the liquid crystal panel 8 in left and right direction. In addition, both end portions of the upper surface of the lamp frame 7 is provided with a horizontal groove portion 7b into which the edge portion of the light diffuser plate 5 is inserted. The lamp frame 7 is made of white synthetic resin so as to serve as a light reflective plate.

Figure 4:
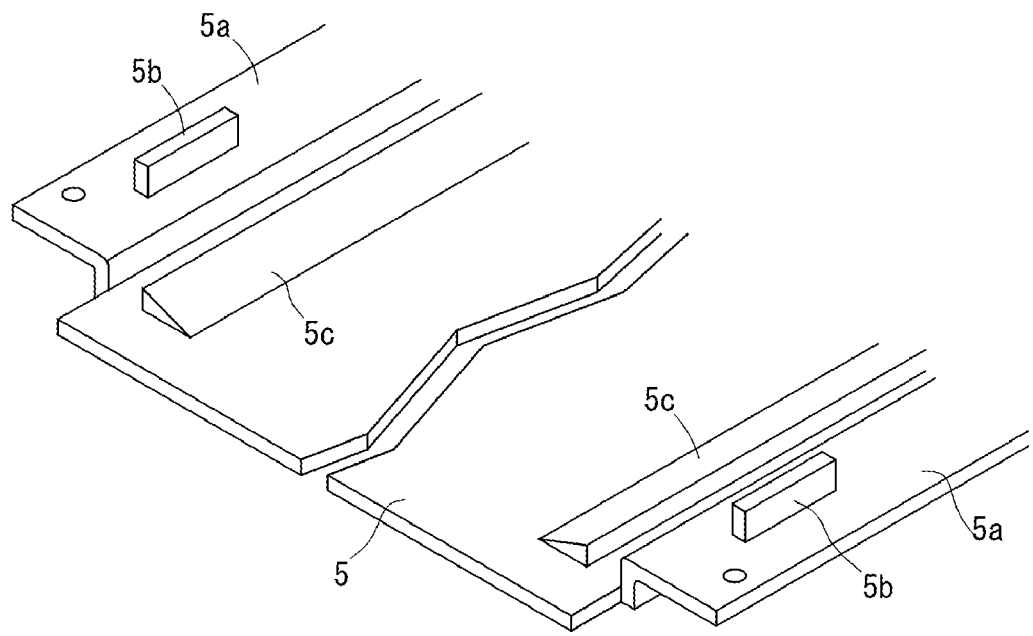
FIG. 4 is a partial perspective view illustrating a light diffuser plate which is formed integrally with frame portions and is provided in the liquid crystal module.

The light diffuser plate 5 disposed at the rear side of the liquid crystal panel 8 is made of transparent synthetic resin containing a light diffusing agent, and uniformly diffuses direct light from the U-shaped cold cathode tubes 3 or reflected light from the reflector sheet 2 to irradiate light onto the liquid crystal panel 8 and thus eliminate the variation in brightness on the display surface. Frame portions 5a and 5b serving as a cell guide are formed integrally with upper and lower long opposite sides of the light diffuser plate 5, as shown in FIGS. 1 and 4. Convex portions 5b are provided in the vicinity of both end portions of the respective frame portions 5a to position the liquid crystal panel 8 in up and down direction. The light diffuser plate 5 is attached to the rear frame 1 by disposing the frame portions 5a of the light diffuser plate 5 on the upper and lower long opposite side plates 1d (double side plates bent in a reversed U-shape) of the rear frame 1, as shown in FIG. 2, and inserting the left and right edge portions of the light diffuser plate 5 into the horizontal groove portion 7b of the lamp frame 7, as shown in FIG. 3.

As shown in FIGS. 1 and 2, long and thin cushion members 6 and 6 having a light shielding property are disposed along and inside the frame portions 5a of the light diffuser plate 5. The upper and lower edge portions of the liquid crystal panel 8 along the long opposite sides are supported by the cushion members 6, and are positioned by the positioning convex portions 5b of the frame portions 5a of the light diffuser plate 5 so that the liquid crystal panel 8 does not move in the up and down direction. The left and right edge portions of the liquid crystal panel 8 along the opposite short sides are supported by the upper surfaces of the lamp frames 7, as shown in FIG. 3, and are positioned by the positioning convex portions 7a so that the liquid crystal panel 8 does not move in the left and right direction.

X-wiring boards (X-PCB) 10a and 10b which have been divided into two segments are connected to the long side edge portion of the liquid crystal panel 8 via a plurality of chip-on-films (COF) 11 on which a source drive IC chip is mounted. In addition, a Y-wiring board (Y-PCB) 13 is connected to the short side edge portion of the liquid crystal panel 8 via chip-on-films (COF) 12 on which a gate drive IC chip is mounted. The X-wiring boards 10a and 10b and the Y-wiring board 13 are fixed to the double-side plate 1d along one long side of the rear frame 1 and the outer surface of the side plate 1a along one short side, respectively.

Four circumferential edges of the liquid crystal panel 8 and four side plates of the rear frame 1 are enclosed by four long and short bezels 9a and 9b which are made from sheet metal. The bezels 9a and 9b are connected to each other in the shape of a rectangular frame. These bezels 9a and 9b are fixed by screws using their connecting portions to the double-side plates 1d of the rear frame 1 together with the frame portions 5a of the light diffuser plate 5.

Figure 5:
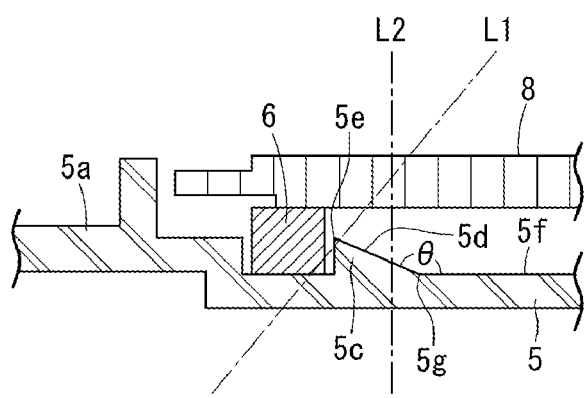
FIG. 5 is an enlarged cross-sectional view illustrating the liquid crystal module according to the embodiment.

Slope portions 5c for concealing the cushion members 6 are formed integrally with the light diffuser plate 5 and disposed inside the cushion members 6. Each slope portion 5c has a slope surface 5d which is inclined in such a manner that the height of the slope portion 5c increases toward an adjacent cushion member 6. Each slope portion 5c has a long and thin band shape along each cushion member 6 and integrally protrudes from the surface of the light diffuser plate. As shown in FIG. 5, a top portion 5e of each slope portion 5c slightly protrudes outside of a viewing angle range of the display surface of the liquid crystal panel 8, which is indicated by an imaginary line L1. In FIG. 5, an imaginary line L2 indicates an end of a display range of the liquid crystal panel 8.

In the liquid crystal module, since the above-mentioned slope portions 5c are formed integrally with the light diffuser plate 5, even when a user sees the display surface of the liquid crystal panel 8 at an angle along the imaginary line L1 indicating the viewing angle range, the portion of the cushion members 6 which enters into the viewing angle range indicated by the imaginary line L1, is completely concealed by the slope portions 5c. Since the diffused light emitting from the slope portions 5c comes into view, the cushion members 6 are not seen from the user. In addition, since the angle θ between the slope surface 5d of each slope portion 5c and a flat surface 5f of the light diffuser plate 5 is an obtuse angle, the bent edge portion 5g is unlikely to be seen. Moreover, since the cushion member 6 has the light shielding property, light does not leak from the edge portion of the liquid crystal panel 8. Consequently, the liquid crystal module has good display quality. In addition, there is an advantage in that if the slope portion 5c is integrally formed with the light diffuser plate 5, the cushion member 6 is interposed and exactly positioned between the frame portions 5a and the slope portions 5c of the light diffuser plate 5.

The inclined angle of the slope surface 5d of the slope portion 5c with respect to the flat surface 5f is not particularly limited, but if the inclined angle is remarkably large, the angle θ between the slope surface 5d of the slope portion 5c and the flat surface 5f of the light diffuser plate 5 gets closer to a right angle from the obtuse angle, so that the bent edge 5g may be seen from the display surface of the liquid crystal panel 8. Therefore, it is preferable that the inclined angle θ of the slope surface 5d is set to be 45° or less and the angle θ is set to be 135° or more.

Figure 6:
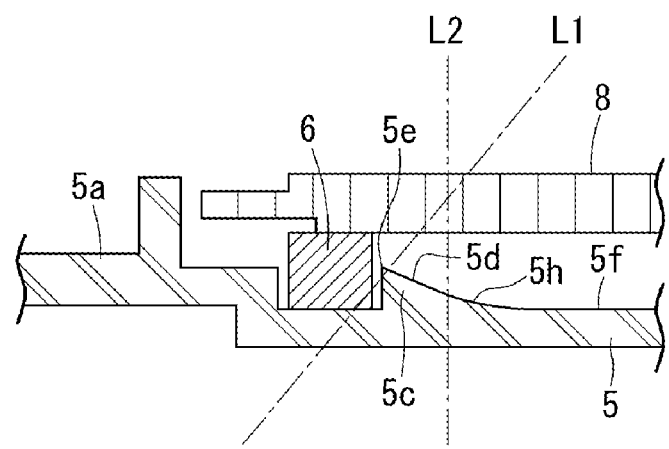
FIG. 6 is an enlarged cross-sectional view illustrating a liquid crystal module according to another embodiment of the present invention.

As shown in FIG. 6, the light diffuser plate 5 may be provided with a curved portion 5h between the slope surface 5d of the slope portion 5c and the flat surface 5f such that the flat surface 5f is smoothly continuous with the slope surface 5d. In a case where the curved portion 5h is provided, the above-mentioned bent edge 5g is completely removed, so that the possibility in which the cushion member is seen from the display surface of the liquid crystal panel 8 is absolutely eliminated, thereby further improving the display quality.

Figure 7:
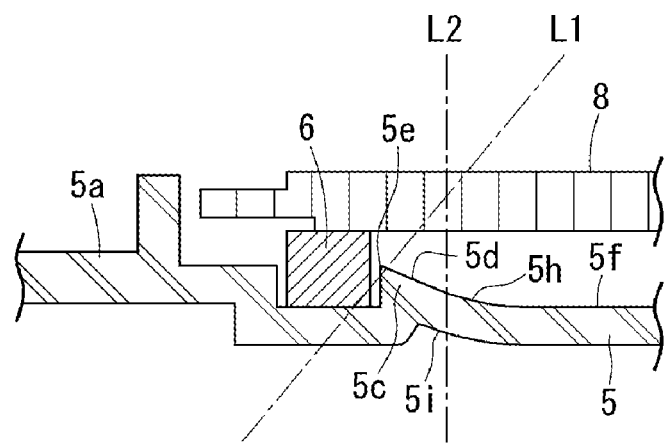
FIG. 7 is an enlarged cross-sectional view illustrating a liquid crystal module according to still another embodiment of the present invention.

As described above, even though the slope portion 5c is formed integrally with the surface of the light diffuser plate 5, there is no concern in that a negative effect such as the variation in brightness occurs at the display surface of the liquid crystal panel 8. However, since the portion of the light diffuser plate 5, where the slope portion 5c is integrally formed becomes slightly thick relative to the other portion of the light diffuser plate 5, a light beam transmittance of the light diffuser plate 5 may be locally slightly deteriorated, so that the variation in brightness may occur slightly at the display surface of the liquid crystal panel 8. In this instance, as shown in FIG. 7, the light diffuser plate 5 may be provided with a concave portion 5i at an opposite side of each slope portion 5c. In other words, the portion of the light diffuser plate 5 where the slope portion 5c is integrally formed is provided with a concave portion 5i at the rear side thereof. If the concave portion 5i is formed, it can suppress the increase in thickness in the portion where the slope portions 5c are integrally formed, thereby preventing the local deterioration of the light beam transmittance. As a result, there is an advantage in that it is possible to eliminate the variation in brightness of the display surface of the liquid crystal panel 8.

In the liquid crystal module according to the above embodiment, the light diffuser plate 5 is formed integrally with the frame portions 5a by using the transparent synthetic resin containing the light diffusing material. But the frame portions 5a may be integrally formed with the light diffuser plate 5 by using colored synthetic resin having a light shielding property, and no light diffusing material by using a two-color formation method. In this way, there is an advantage that it is possible to eliminate the concern that the light leaks from the frame portions 5a.

Figure 8:
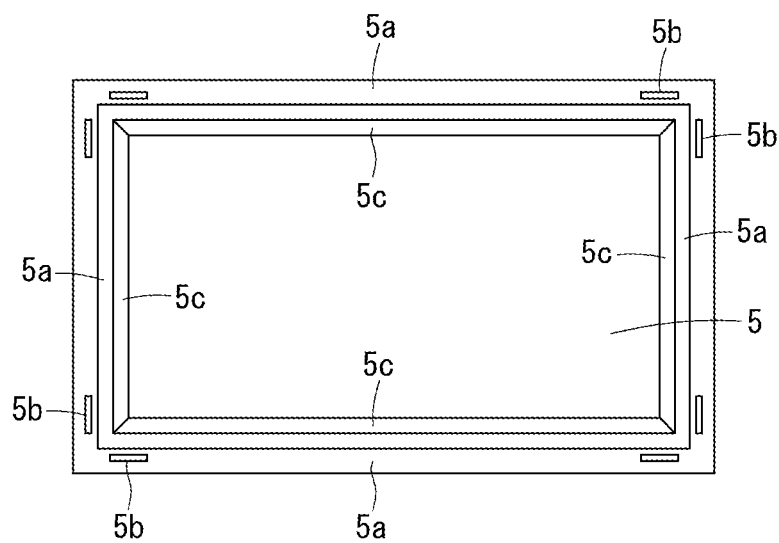
FIG. 8 is a plan view illustrating an light diffuser plate which is formed integrally with frame portions and is provided in a liquid crystal module according to another embodiment of the present invention.
Figure 9:
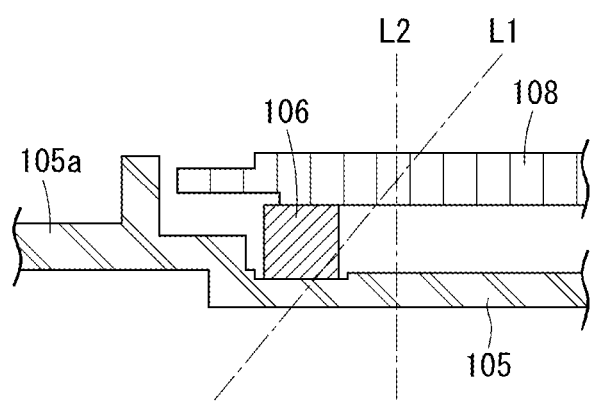
FIG. 9 is a partial enlarged cross-sectional view illustrating a related-art liquid crystal module.

In addition, in the liquid crystal module according to the above embodiment, the frame portions 5a are formed integrally with upper and lower long opposite sides of the light diffuser plate 5 and the slope portions 5c are formed integrally with the light diffuser plate 5 and are disposed inside the cushion members 6 which are disposed along the frame portions 5a. However, as shown in FIG. 8, it may be configured in such a manner that the frame portions 5a are formed integrally with four sides of the light diffuser plate 5, the slope portion 5c protrudes in the frame portion in the shape of a rectangular frame, so as to be formed integrally with the light diffuser plate 5, and the cushion member is interposed between the frame portion 5a and the slope portion 5c. In this instance, the positioning convex portion 7a and the horizontal groove portion 7b which are formed at the lamp frames 7 may be omitted by disposing the frame portion 5a of the light diffuser plate 5 corresponding to four sides on the upper and lower double-side plates 1d and 1d of the rear frame 1 and the lamp frames 7, attaching the light diffuser plate 5 and forming the positioning convex portions 5b of the liquid crystal panel 8 at positions in the vicinity of both ends of the respective frame portions 5a along four sides.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A liquid crystal module, comprising:
a rear frame provided with a pair of side plates which are formed along a pair of long opposite sides of the rear frame;
a light diffuser plate comprised of synthetic resin and provided with a pair of frame portions which are formed integrally with the light diffuser plate, disposed along a pair of long opposite sides of the light diffuser plate and respectively attached to the side plates of the rear frame;
a pair of cushion members disposed along and inside the frame portions of the light diffuser plate; and
a liquid crystal panel having an upper edge portion and lower edge portion which are supported by the cushion members,
wherein the light diffuser plate is provided with a pair of slope portions which are formed integrally with the light diffuser plate and disposed along and inside the cushion members, and
wherein the height of each slope portion increases toward an adjacent cushion member for concealing the cushion members.

2. The liquid crystal module as set forth in claim 1, wherein a top portion of each slope portion protrudes outside of a viewing angle range of a display surface of the liquid crystal panel.

3. The liquid crystal module as set forth in claim 1, wherein the light diffuser plate is provided with a concave portion at an opposite side of each slope portion.

4. The liquid crystal module as set forth in claim 1, wherein the light diffuser plate is provided with a curved portion between a slope surface of the slope portion and a flat surface of the light diffuser plate so that the flat surface is smoothly continuous with the slope surface.

* * * * *